United States Patent
Yuasa (10) Patent No.: US 9,884,563 B2
(45) Date of Patent: Feb. 6, 2018

(54) POWER RECEIVING DEVICE AND POWER TRANSMITTING DEVICE

(71) Applicant: TOYOTA JIDOSHA KABUSHIKI KAISHA, Toyota-shi, Aichi-ken (JP)

(72) Inventor: Hiroaki Yuasa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 37 days.

(21) Appl. No.: 15/030,174

(22) PCT Filed: Nov. 18, 2014

(86) PCT No.: PCT/JP2014/080532
§ 371 (c)(1),
(2) Date: Apr. 18, 2016

(87) PCT Pub. No.: WO2015/072574
PCT Pub. Date: May 21, 2015

(65) Prior Publication Data
US 2016/0250934 A1    Sep. 1, 2016

(30) Foreign Application Priority Data

Nov. 18, 2013   (JP) .................................. 2013-237712

(51) Int. Cl.
*H01F 27/42*    (2006.01)
*B60L 11/18*    (2006.01)
(Continued)

(52) U.S. Cl.
CPC .......... *B60L 11/182* (2013.01); *H01F 27/362* (2013.01); *H01F 38/14* (2013.01); *H02J 50/12* (2016.02); *B60L 5/00* (2013.01); *Y02T 10/7005* (2013.01); *Y02T 10/7072* (2013.01); *Y02T 90/122* (2013.01); *Y02T 90/14* (2013.01)

(58) Field of Classification Search
None
See application file for complete search history.

(56) References Cited

U.S. PATENT DOCUMENTS

| 7,741,734 B2 | 6/2010 | Joannopoulos et al. |
| 2007/0222542 A1 | 9/2007 | Joannopoulos et al. |

(Continued)

FOREIGN PATENT DOCUMENTS

| AU | 2006269374 B2 | 1/2007 |
| AU | 2007349874 A2 | 10/2008 |

(Continued)

*Primary Examiner* — Cassandra Cox
(74) *Attorney, Agent, or Firm* — Oliff PLC (57) ABSTRACT

A power receiving unit adopted for this power receiving device includes a core unit having a plate-like shape and including a side surface, an upper surface and a lower surface, and a power receiving coil helically wound about a coil winding axis to surround the core unit including the upper and lower surfaces, the shield including a first shield disposed on the side of one end of the power receiving unit in an axial direction of the coil winding axis, and a second shield disposed on the side of the other end of the power receiving unit in the axial direction of the coil winding axis, the shield being absent at least at a location directly above a center portion of the power receiving unit.

6 Claims, 9 Drawing Sheets (51) Int. Cl.
*H01F 38/14* (2006.01)
*H01F 27/36* (2006.01)
*H02J 50/12* (2016.01)
*B60L 5/00* (2006.01)

(56) References Cited

U.S. PATENT DOCUMENTS

| | | |
|---|---|---|
| 2008/0278264 A1 | 11/2008 | Karalis et al. |
| 2009/0058358 A1 | 3/2009 | Inoue et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2012/0218068 A1 | 8/2012 | Yamakawa et al. |
| 2013/0127409 A1 | 5/2013 | Ichikawa |
| 2013/0193749 A1 | 8/2013 | Nakamura et al. |
| 2014/0084697 A1 | 3/2014 | Yasuda et al. |
| 2014/0361635 A1 | 12/2014 | Ookawa et al. |
| 2015/0008877 A1 | 1/2015 | Ichikawa et al. |

FOREIGN PATENT DOCUMENTS

| | | |
|---|---|---|
| AU | 2010200044 A1 | 1/2010 |
| AU | 2006269374 C1 | 3/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| CN | 102651499 A | 8/2012 |
| CN | 103339698 A | 10/2013 |
| EP | 1902505 A2 * | 3/2008 |
| EP | 2130287 A1 * | 12/2009 |
| IN | 735/DELNP/2008 | 5/2008 |
| IN | 6195/DELNP/2009 | 7/2010 |
| JP | 2009-501510 A | 1/2009 |
| JP | 2012-178529 A | 9/2012 |
| JP | 2013-055229 A | 3/2013 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2013-172116 A | 9/2013 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |

\* cited by examiner

POWER RECEIVING DEVICE AND POWER TRANSMITTING DEVICE

TECHNICAL FIELD

The present invention relates to a power receiving device which receives electric power from a power transmitting device contactlessly, and a power transmitting device which transmits electric power to a power receiving device contactlessly.

BACKGROUND ART

As disclosed in Japanese Patent Laying-Open No. 2013-154815 (document 1), Japanese Patent Laying-Open No. 2013-146154 (document 2), Japanese Patent Laying-Open No. 2013-146148 (document 3), Japanese Patent Laying-Open No. 2013-110822 (document 4), Japanese Patent Laying-Open No. 2013-126327 (document 5) and Japanese Patent Laying-Open No. 2013-172116 (document 6), a power receiving device and a power transmitting device which transmit and receive electric power contactlessly are known. For example, document 1 (see FIG. 9) discloses a power receiving device including a power receiving unit, that comprises a shielding casing opened downward, a lid made of resin provided to close the opening of this shielding casing, a core unit which has a ferrite core provided inside the shielding casing, and a power receiving coil wound around this core unit. The power transmitting device also has a similar configuration. Document 6 discloses a power transfer system in which a power receiving device and a power transmitting device include a shield in order to suppress an externally leaking electromagnetic field.

For example, the shield adopted for this power receiving device has a generally box shape surrounding a power receiving coil and also having an opening opened downward (toward the power transmitting device). The shield adopted for the power transmitting device has a generally box shape surrounding a power transmitting coil and also having an opening opened upward (toward the power receiving device).

CITATION LIST

Patent Documents

PTD 1: Japanese Patent Laying-Open No. 2013-154815
PTD 2: Japanese Patent Laying-Open No. 2013-146154
PTD 3: Japanese Patent Laying-Open No. 2013-146148
PTD 4: Japanese Patent Laying-Open No. 2013-110822
PTD 5: Japanese Patent Laying-Open No. 2013-126327
PTD 6: Japanese Patent Laying-Open No. 2013-172116

SUMMARY OF INVENTION

Technical Problem

The above described shield adopted for a power receiving device is configured to cover a power receiving coil, as described above. As a result, the shape and weight of the shield itself are increased, and an increase of the cost required for the shield is invited. This also applies to the power transmitting device.

The present invention has been made in view of the above problem, and an object of the present invention is to provide a power receiving device and a power transmitting device including a structure of a shield which can reduce a cost required for the shield, without impairing a function which suppresses leakage of electromagnetic field.

Solution to Problem

This power receiving device comprises: a power receiving unit receiving electric power contactlessly from a power transmitting unit having a power transmitting coil, in a state in which the power receiving unit faces the power transmitting unit; and a shield provided at a side opposite to a side at which at least the power transmitting unit is located, with the power receiving unit posed therebetween, the power receiving unit including a core unit having a plate-like shape and including a side surface, an upper surface and a lower surface, and a power receiving coil helically wound about a coil winding axis to surround the core unit including the upper and lower surfaces, the shield including a first shield disposed on a side of one end of the power receiving unit in an axial direction of the coil winding axis, and a second shield disposed on a side of an other end of the power receiving unit in the axial direction of the coil winding axis, the shield being absent at least at a location directly above a center portion of the power receiving unit.

According to the configuration of the above power receiving device, while an electromagnetic field is radiated intensively from the sides of one and the other ends of the power receiving unit as seen along the coil winding axis, a first shield is disposed on the side of one end of the power receiving coil as seen along the coil winding axis, and a second shield is disposed on the side of the other end of the power receiving coil as seen along the coil winding axis. This can effectively prevent the electromagnetic field from externally leaking and thus suppress an increase of the otherwise leaking electromagnetic field.

Furthermore, there is a little radiation of the electromagnetic field from a center portion of the power receiving unit, and accordingly, avoiding providing the shield at least at a location directly above a center portion of the power receiving coil can reduce a material required for the shield and hence a cost required for the shield.

This power transmitting device comprises: a power transmitting unit transmitting electric power contactlessly to a power receiving unit having a power receiving coil, in a state in which the power transmitting unit faces the power receiving unit; and a shield provided at a side opposite to a side at which at least the power receiving unit is located, with the power transmitting unit posed therebetween, the power transmitting unit including a core unit having a plate-like shape and including a side surface, an upper surface and a lower surface, and a power transmitting coil helically wound about a coil winding axis to surround the core unit including the upper and lower surfaces, the shield including a first shield disposed on a side of one end of the power transmitting unit in an axial direction of the coil winding axis, and a second shield disposed on a side of an other end of the power transmitting unit in the axial direction of the coil winding axis, the shield being absent at least at a location directly above a center portion of the power transmitting unit.

According to the configuration of the above power transmitting device, while an electromagnetic field is radiated intensively from the sides of one and the other ends of the power transmitting unit as seen along the coil winding axis, a first shield is disposed on the side of one end of the power transmitting coil as seen along the coil winding axis, and a second shield is disposed on the side of the other end of the power transmitting coil as seen along the coil winding axis.

This can effectively prevent the electromagnetic field from externally leaking and thus suppress an increase of the otherwise leaking electromagnetic field.

Furthermore, there is a little radiation of the electromagnetic field from a center portion of the power transmitting unit, and accordingly, avoiding providing the shield at least at a location directly above a center portion of the power transmitting coil can reduce a material required for the shield and hence a cost required for the shield.

Advantageous Effects of Invention

The above configuration can provide a power receiving device and a power transmitting device including a structure of a shield which can reduce a cost required for the shield, without impairing a function which suppresses leakage of electromagnetic field.

DESCRIPTION OF EMBODIMENTS

Each embodiment based on the present invention will now be described hereinafter with reference to the drawings. Note that in the description of each embodiment, when numbers, amounts and the like are referred to, the present invention is not necessarily limited thereto unless otherwise indicated. In describing each embodiment and each example, identical and corresponding components are identically denoted and may not be described repeatedly.

First Embodiment

Figure 1:
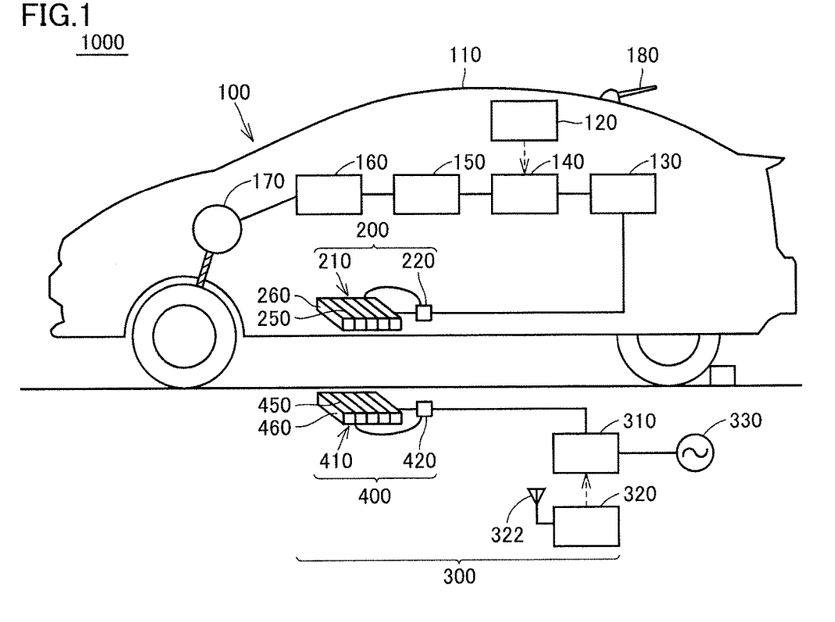
FIG. 1 schematically shows a power transfer system of a first embodiment.

With reference to FIG. 1, a power transfer system 1000 in a first embodiment will be described. FIG. 1 schematically shows a general configuration of power transfer system 1000. Power transfer system 1000 includes an electrically powered vehicle 100 (a vehicle) and an external power feeding apparatus 300.

(Electrically Powered Vehicle 100)

With reference to FIG. 1, electrically powered vehicle 100 includes a vehicular body 110 and a power receiving device 200. Vehicular body 110 is provided with a vehicular ECU 120 (a control unit), a rectifier 130, a DC/DC converter (hereafter simply referred to as a "converter") 140, a battery 150, a power control unit (hereafter simply referred to as a "PCU") 160, a motor unit 170, a communication unit 180, etc. Power receiving device 200 has a power receiving coil 250 and is disposed at a bottom surface of vehicular body 110.

External power feeding apparatus 300 includes a power transmitting device 400, and power transmitting device 400 has a power transmitting coil 450. Power receiving device 200 receives electric power contactlessly from power transmitting device 400 in a condition in which power receiving coil 250 of power receiving device 200 faces power transmitting coil 450 of power transmitting device 400. Power receiving device 200 has a power receiving unit 210, a capacitor 220 connected to power receiving unit 210, and a shield described later. Power receiving unit 210 has a solenoid type core unit 260 and power receiving coil 250.

Power receiving coil 250 has a stray capacitance and is connected to rectifier 130. An electrical circuit is formed by the coefficient of induction of power receiving coil 250, and the stray capacitance of power receiving coil 250 and the electric capacitance of capacitor 220. Although capacitor 220 and power receiving coil 250 are connected in series, they may be connected in parallel.

In power transfer system 1000, when vehicular body 110 is stopped and vehicular ECU 120 detects that a power feeding button is set in the ON state, a mode of operation of the vehicle is switched to a charging mode. Vehicular ECU 120 issues an instruction via communication unit 180 to perform controlling of charging of battery 150 by external power feeding apparatus 300.

(External Power Feeding Apparatus 300)

External power feeding apparatus 300 includes power transmitting device 400, a high-frequency power device 310, a power transmitting ECU 320, and a communication unit 322. High-frequency power device 310 is connected to an alternating current power supply 330. Alternating current power supply 330 is a commercial power supply or an independent power supply apparatus or the like. Power transmitting device 400 is provided in a parking space and is connected to high-frequency power device 310. Power transmitting ECU 320 controls driving of high-frequency power device 310 etc.

Communication unit 322 is a communication interface for performing wireless communication between external power feeding apparatus 300 and electrically powered vehicle 100. Communication unit 322 receives from communication unit 180 of electrically powered vehicle 100 battery information, a signal of an instruction to start, continue and stop electric power transfer, a signal of an instruction to increase/decrease electric power transferred, and the like, and outputs these pieces of information to power transmitting ECU 320.

Power transmitting device 400 has power transmitting unit 410, a capacitor 420 connected to power transmitting unit 410, and a shield described later. Power transmitting unit 410 has a solenoid type core unit 440 and power transmitting coil 450. Power transmitting coil 450 has a stray capacitance, and is connected to high-frequency power device 310. An electrical circuit is formed by the coefficient of induction of power transmitting coil 450, and the stray capacitance of power transmitting coil 450 and the electric capacitance of capacitor 420. Although capacitor 420 and power transmitting coil 450 are connected in series, they may be connected in parallel.

High frequency electric power device 310 converts electric power received from alternating current power supply 330 into high frequency electric power and supplies the converted high frequency electric power to power transmitting coil 450. Power transmitting coil 450 transmits electric power to power receiving coil 250 of power receiving unit 210 contactlessly by electromagnetic induction.

Thus, in power transmitting device 400, high-frequency power device 310 converts the electric power received from alternating current power supply 330 into electric power of high frequency, and supplies the converted high-frequency power to power transmitting coil 450. Each of power transmitting unit 410 and power receiving unit 210 includes a coil (450,250) and a capacitor (420,220), and is designed to resonate at a transfer frequency. Preferably, a Q factor which indicates a resonance strength of power transmitting unit 410 and power receiving unit 210 is equal to or greater than 100.

Figure 2:
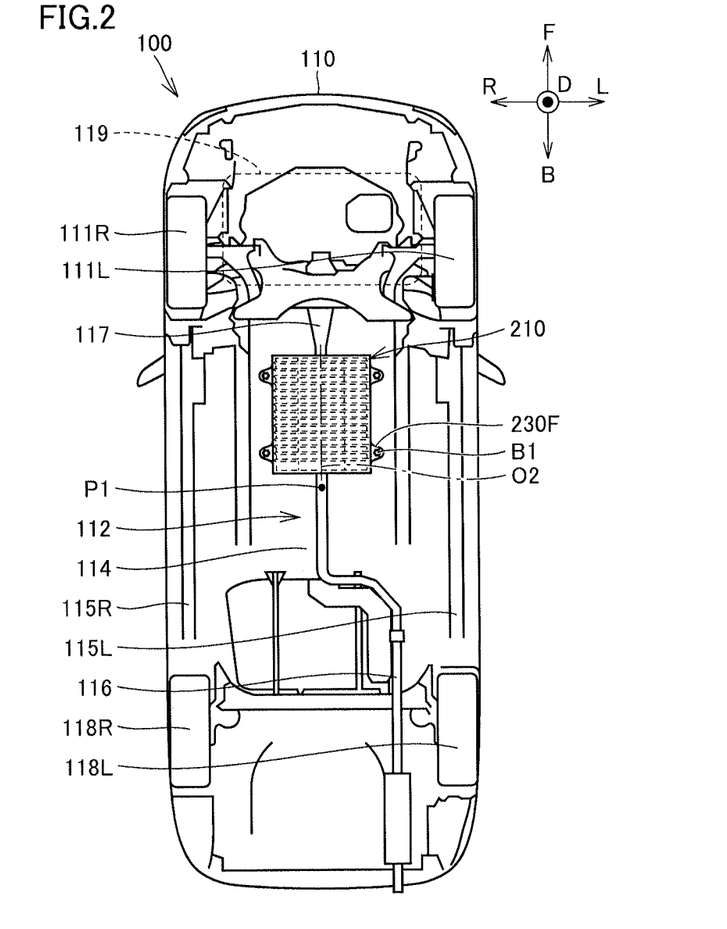
FIG. 2 is a bottom view showing an electrically powered vehicle of the first embodiment.

(Arrangement of Power Receiving Unit 210)

Where power receiving unit 210 is disposed will now be described with reference to FIG. 2. FIG. 2 is a bottom view of electrically powered vehicle 100. In FIG. 2, "D" denotes a vertically downward direction D. "L" denotes a leftward direction L relative to the vehicle. "R" denotes a rightward direction R relative to the vehicle. "F" denotes a frontward direction F relative to the vehicle. "B" denotes a backward direction B relative to the vehicle. "U" denotes a vertically upward direction. These also apply to FIG. 3-FIG. 8 described hereinafter.

With reference to FIG. 2, vehicular body 110 of electrically powered vehicle 100 has a bottom surface 112. Bottom surface 112 is a region of vehicular body 110 that can be observed at a position distant in vertically downward direction D relative to the ground surface with vehicular wheels 111R, 111L, 118R, and 118L in contact with the ground surface.

Bottom surface 112 has a center position P1. Center position P1 is located at a center of bottom surface 112 in a forward and backward direction (vehicular frontward direction F and vehicular backward direction B) of vehicular body 110, and is also located at a center of bottom surface 112 in a vehicular widthwise direction (vehicular leftward direction L and vehicular rightward direction R) of vehicular body 110. Bottom surface 112 is provided with a floor panel 114, side members 115R and 115L, an exhaust pipe 116, a cross member (not shown) and the like. Floor panel 114 has a plate-like shape, and sectionalizes an interior of vehicular body 110 and an exterior of vehicular body 110. Side members 115R and 115L and the cross member are disposed at a lower surface of floor panel 114.

Vehicular body 110 includes an engine 119, and engine 119 is disposed frontwardly of center position P1 in the forward and backward direction (or on the side of vehicular frontward direction F). Exhaust pipe 116 is connected to engine 119 via a catalyst 117.

Power receiving unit 210 is provided on bottom surface 112 of vehicular body 110. Power receiving unit 210 is disposed rearwardly of engine 119 in the forward and backward direction (or on the side of vehicular backward direction B), and is disposed frontwardly of center position P1 in the forward and backward direction (or on the side of vehicular frontward direction F). A coil winding axis O2 of power receiving coil 250 of power receiving unit 210 extends in a direction parallel to the forward and backward direction of vehicular body 110. It is contemplated that when electrically powered vehicle 100 is parked in a parking space at a prescribed position allowing power transfer, coil winding axis O2 of power receiving coil 250 and a coil winding axis of power transmitting coil 450 (see FIG. 1) are parallel to each other.

As shown in FIG. 2, in the present embodiment, a flange 230F provided at a side portion of power receiving unit 210 (at four locations) is utilized to fix power receiving unit 210 to floor panel 114 using a bolt B1. Floor panel 114 is previously provided with a nut N1 (or a tap). Flange 230F is provided integrally relative to resin member 230 by insertion-molding. In a plan view, an external dimension of power receiving unit 210 excluding flange 230F is approximately 240 mm×290 mm. These dimensions are an example and are not exclusive.

Exhaust pipe 116 is disposed in a center tunnel 114T of floor panel 114. Power receiving unit 210 of power receiving device 200 is disposed under exhaust pipe 116 and faces exhaust pipe 116 with a spacing from exhaust pipe 116.

(Structure of Power Receiving Unit 210 and Shield 240)

Figure 3:
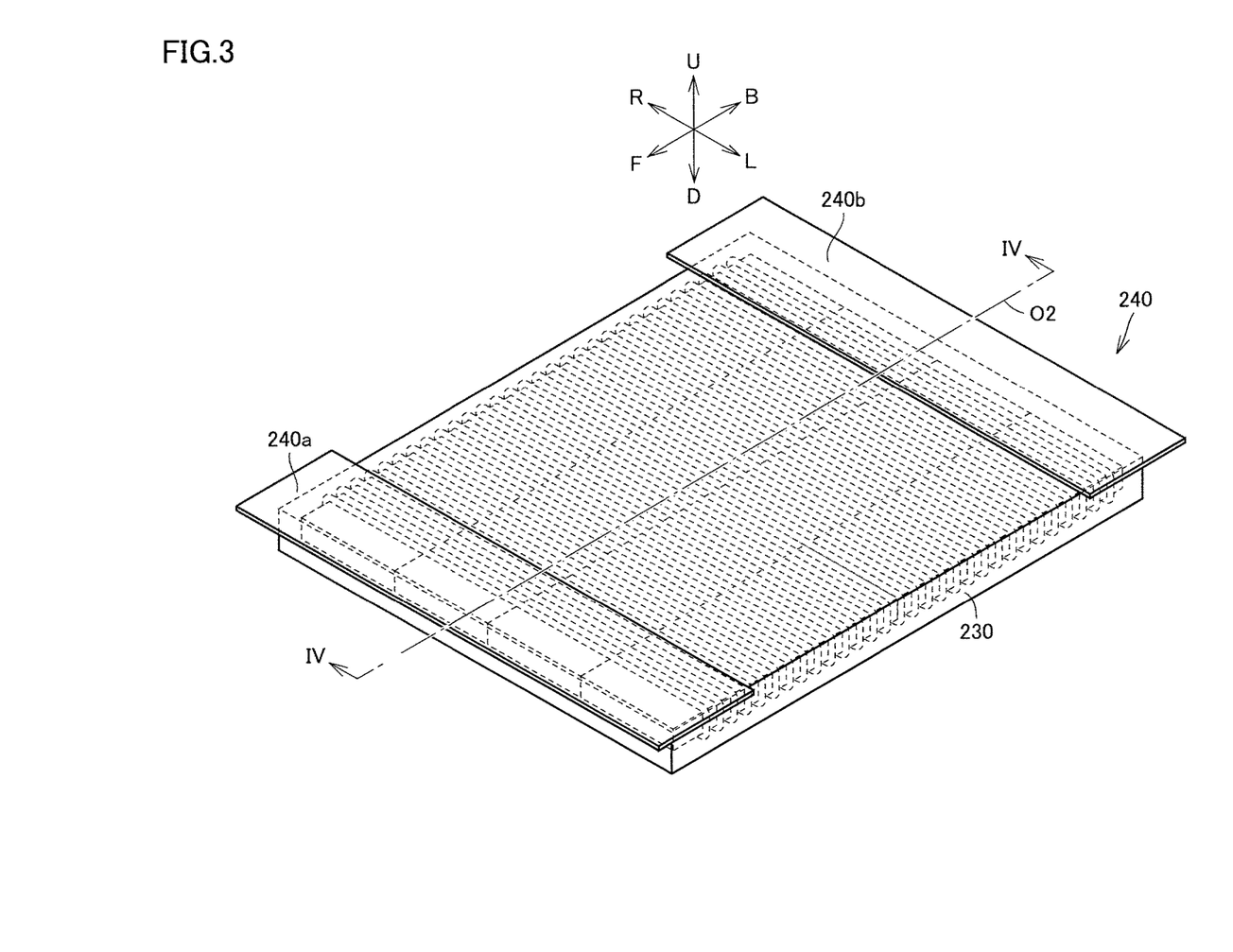
FIG. 3 is a perspective view showing a structure of a power receiving unit and a shield of the first embodiment.
Figure 4:
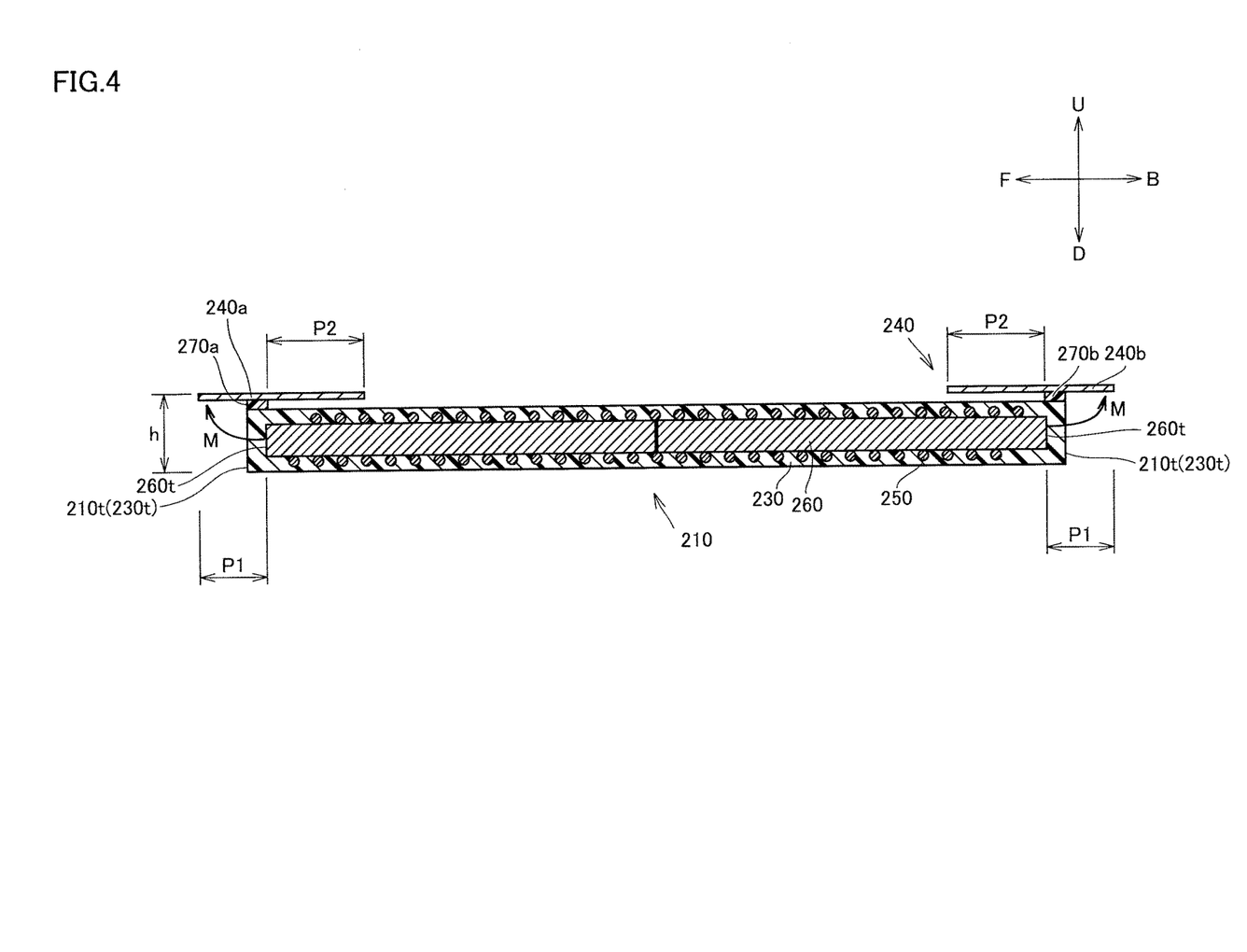
FIG. 4 is a cross section taken along a line IV-IV in FIG. 3 and seen in the direction of the arrows.

With reference to FIG. 3 and FIG. 4, a structure of power receiving unit 210 and shield 240 will now be described. FIG. 3 is a perspective view showing a structure of power receiving unit 210 and shield 240, and FIG. 4 is a cross section taken along a line Iv-Iv in FIG. 3 and seen in the direction of the arrows. Note that flange 230F provided to power receiving unit 210, as shown in FIG. 2, is not shown here. This also applies to the following description.

(Power Receiving Unit 210)

Power receiving unit 210 includes power receiving coil 250, core unit 260, and resin member 230 where core unit 260 and power receiving coil 250 are buried therein. Power receiving coil 250 is helically wound on core unit 260 about coil winding axis O2 to surround core unit 260 including upper and lower surfaces of core unit 260. Resin member 230 has a plate-like shape having a side surface, an upper surface and a lower surface, and has core unit 260 and power receiving coil 250 buried therein. Resin member 230 is for example a noncombustible polyester or the like.

Core unit 260 has a plate-like shape as a whole having a side surface, an upper surface and a lower surface. Core unit 260 is formed of a plurality of split cores combined together and surrounded by an insulating paper. The split cores are ferrite. Eight split cores are used in the present embodiment. Each split core is formed in a rectangular parallelepiped and has the same shape and size. The eight split cores are aligned in four rows in the vehicular widthwise direction (or in the column direction) of vehicular body 110 and in two rows in the forward and backward direction of vehicular body 110.

In FIG. 3 and FIG. 4, a total height (h) of power receiving unit 210 including shield 240 is approximately 20 mm. The thickness of core unit 260 is approximately 9 mm, the coil diameter of power receiving coil 250 is approximately 3 mm, the thickness of resin member 230 on the side of the upper surface and that of the lower surface (or the resin's covering thickness) is approximately 4 mm, and the plate thickness (t1) of shield 240 is approximately 0.5 mm.

(Shield 240)

Shield 240 is provided at a side (i.e., an upper side in the present embodiment) opposite to a side at which at least power transmitting unit 410 is located, with power receiving unit 210 posed therebetween. Shield 240 includes a first shield 240a disposed on the side of one end of power receiving unit 210 in an axial direction of coil winding axis O2, and a second shield 240b disposed on the side of the other end of power receiving unit 210 in the axial direction of coil winding axis O2. In the present embodiment, first shield 240a and second shield 240b for a total of two pieces of shields are used. First shield 240a and second shield 240b are rectangular copper or aluminum plates or the like having a shielding function.

By a spacer 270a using a resin member etc. provided on an upper surface of resin member 230, first shield 240a is spaced from the upper surface of resin member 230 by a prescribed spacing. By a spacer 270*b* using a resin member etc. provided on an upper surface of resin member 230, second shield 240*b* is spaced from the upper surface of resin member 230 by a prescribed spacing. By providing a space between first and second shields 240*a* and 240*b* and the upper surface of resin member 230, an insulation performance between first and second shields 240*a* and 240*b* and resin member 230 can be improved. First shield 240*a* and second shield 240*b* are spaced by a prescribed spacing in the direction of coil winding axis O2, and no shield is provided at a location directly above a center portion of power receiving unit 210.

With reference to FIG. 4, first shield 240*a* is disposed on the side of one end of power receiving unit 210 in the axial direction of coil winding axis O2. Similarly, second shield 240*b* is disposed on the side of the other end of power receiving unit 210 in the axial direction of coil winding axis O2. As a result, shield 240 is not provided at a center portion of power receiving unit 210 including opposite end sides (or ends in the RL direction) of power receiving unit 210, and the center portion of power receiving unit 210 including the opposite end sides of power receiving unit 210 is not covered with shield 240.

(Function and Effect)

While an electromagnetic field is intensively radiated from the side of one end of power receiving unit 210, according to shield 240 in the present embodiment as above, first shield 240*a* can be disposed at a region on the side of one end of power receiving unit 210 to effectively prevent the electromagnetic field from externally leaking and thus suppress an increase of the otherwise leaking electromagnetic field. Second shield 240*b* provided at the other end is also similarly discussed.

Preferably it is recommendable to project out of an end 210*t* of power receiving unit 210 (or core unit 260) sideways (see a length P1 in FIG. 4). An electromagnetic field M is such that an electromagnetic field radiated from an end 260*t* of core unit 260 passes through resin member 230 and is radiated particularly intensively from end 210*t* of power receiving unit 210. First shield 240*a* projecting out of an end of power receiving unit 210 sideways can more effectively prevent the electromagnetic field from externally leaking and thus suppress an increase of the otherwise leaking electromagnetic field. Second shield 240*b* provided at the other end is also similarly discussed.

Note that, as described above, with electromagnetic field M radiated particularly intensively from end 260*t* of core unit 260, first shield 240*a* projecting out of end 260*t* of core unit 260 sideways, even without projecting out of end 210*t* of power receiving unit 210 (or the same position as end 230*t* of resin member 230) sideways, can effectively prevent the electromagnetic field from externally leaking. Furthermore, even if first shield 240*a* does not project out of end 260*t* of core unit 260 sideways, it is still possible to effectively prevent the electromagnetic field from externally leaking. Second shield 240*b* provided at the other end is also similarly discussed.

Furthermore, while electromagnetic field M is radiated intensively from end 260*t* of core unit 260, it is also radiated from a region close to end 260*t*, and first shield 240*a* may be provided to cover power receiving unit 210 by a prescribed distance (a length P2 in FIG. 4) from end 260*t* of core unit 260 inward. Second shield 240*b* provided at the other end is also similarly discussed.

Furthermore, there is a little radiation of electromagnetic field M from a center portion of power receiving unit 210, and accordingly, in the present embodiment, shield 240 is not provided at a center portion of power receiving unit 210 including opposite end sides (or ends in the RL direction) of power receiving unit 210, and the center portion of power receiving unit 210 including the opposite end sides of power receiving unit 210 is not covered with shield 240. This can reduce a material required for shield 240 and hence a cost required for shield 240. Furthermore, while in shield 240 an eddy current may be generated by electromagnetic field M and the shield's own temperature may rise and thus cause a problem, the present embodiment allows shield 240 to have a reduced area, and thus prevents the shield from per se having an increased temperature causing a problem.

Second Embodiment

Figure 5:
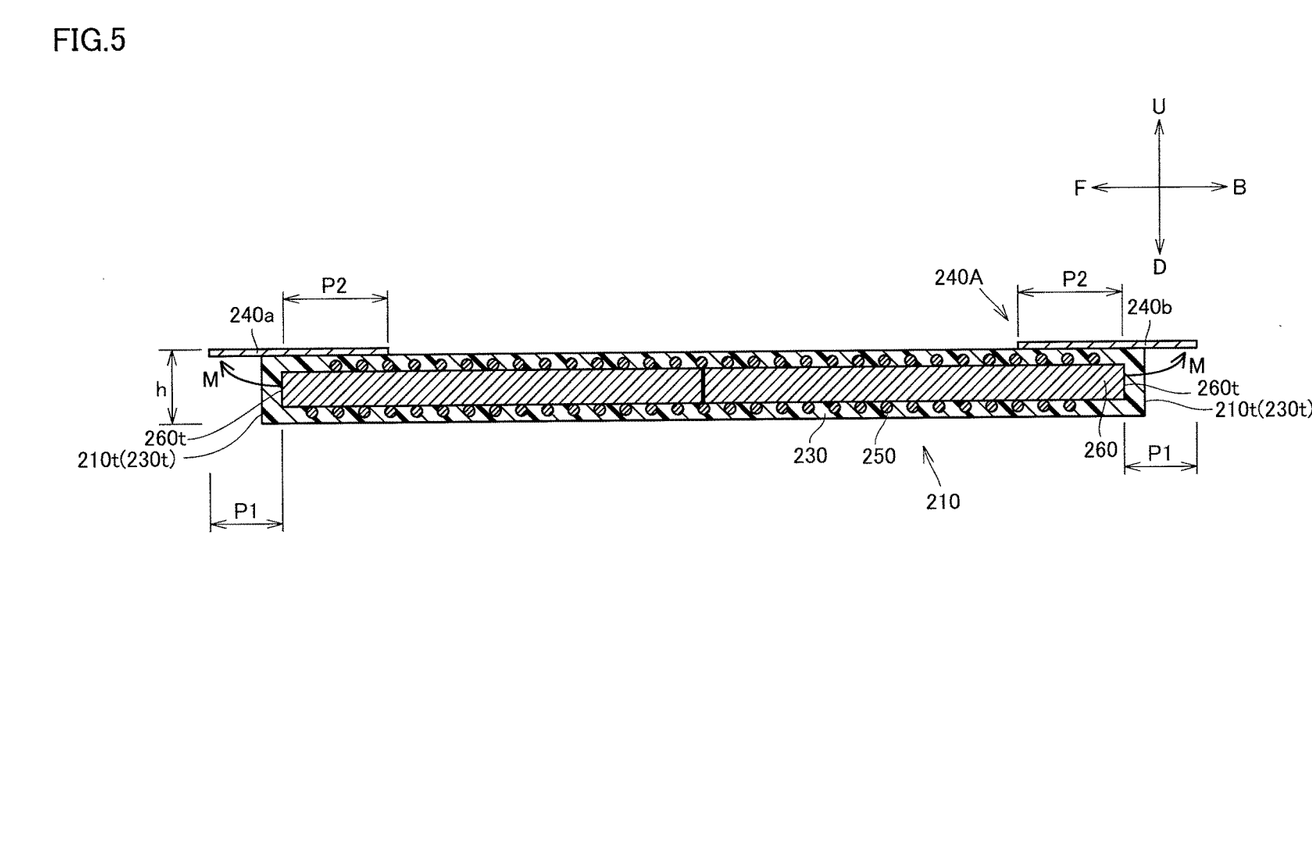
FIG. 5 is a cross section showing a structure of a shield of a second embodiment.

With reference to FIG. 5, a configuration of a shield 240A adopted for a power receiving device in a second embodiment will now be described. While shield 240A in the present embodiment has the same form as shield 240 of the above first embodiment, shield 240A is directly fixed to an upper surface of resin member 230 without a spacer.

Although this structure does not provide the same insulation performance between first and second shields 240*a* and 240*b* and resin member 230 as the configuration of the first embodiment, the former can provide other functions and effects similar to those of the first embodiment.

Third Embodiment

Figure 6:
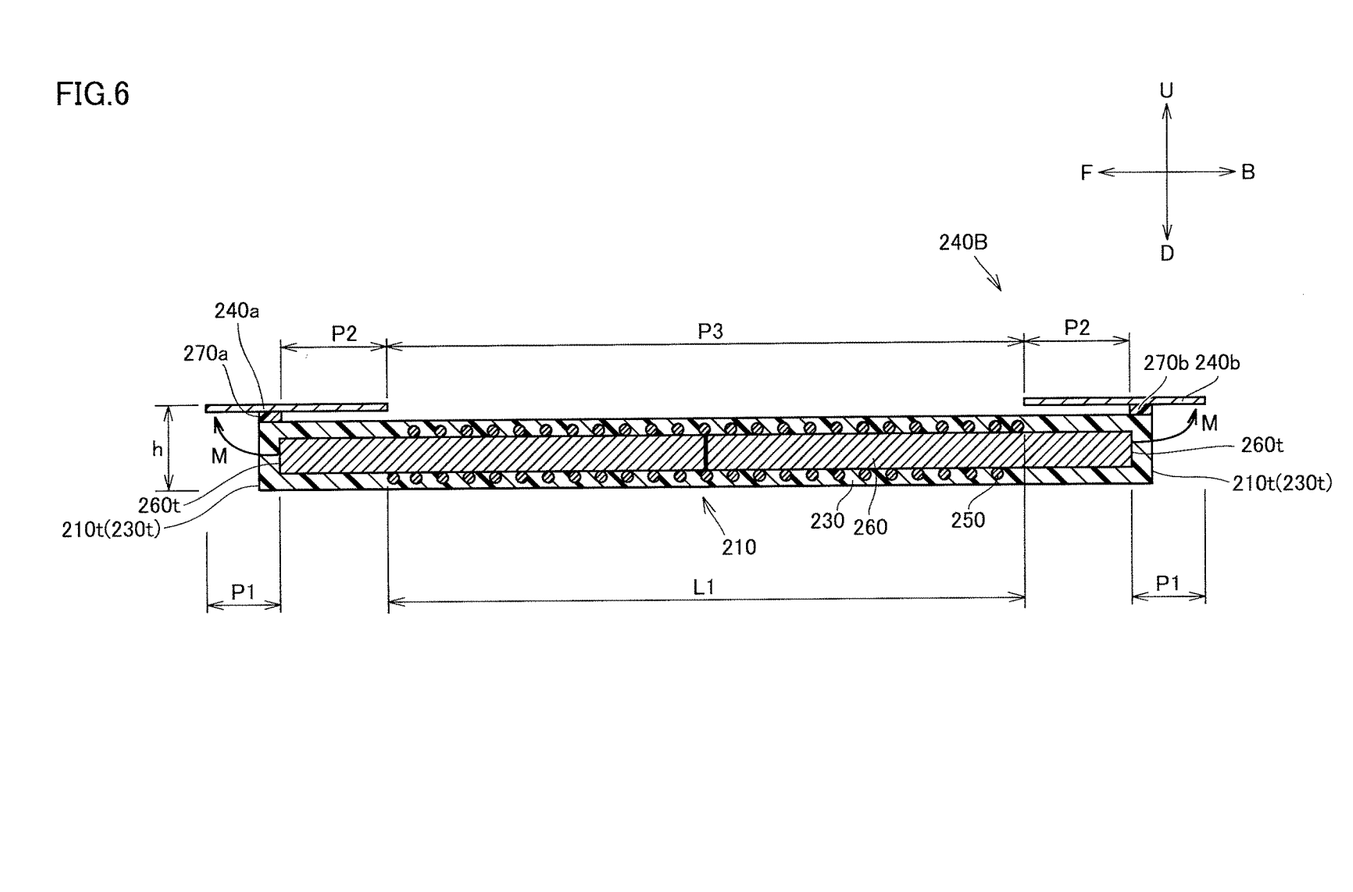
FIG. 6 is a cross section showing a structure of a shield of a third embodiment.

With reference to FIG. 6, a configuration of a shield 240B adopted for a power receiving device in a third embodiment will now be described. While shield 240B in the present embodiment has the same form as shield 240 of the above first embodiment, in shield 240B first shield 240*a* disposed at one end has an inner position (i.e., the length of P2 in FIG. 6) at substantially the same position as the position of an end of power receiving coil 250. Second shield 240*b* provided at the other end is also similarly discussed.

In this structure, the length of the region located between first shield 240*a* and second shield 240*b* and free of shield 240B in the axial direction of coil winding axis O2 is substantially equal to the length of power receiving coil 250 in the axial direction of coil winding axis O2. This configuration can also achieve a function and effect similar to that of the above first embodiment.

Fourth Embodiment

Figure 7:
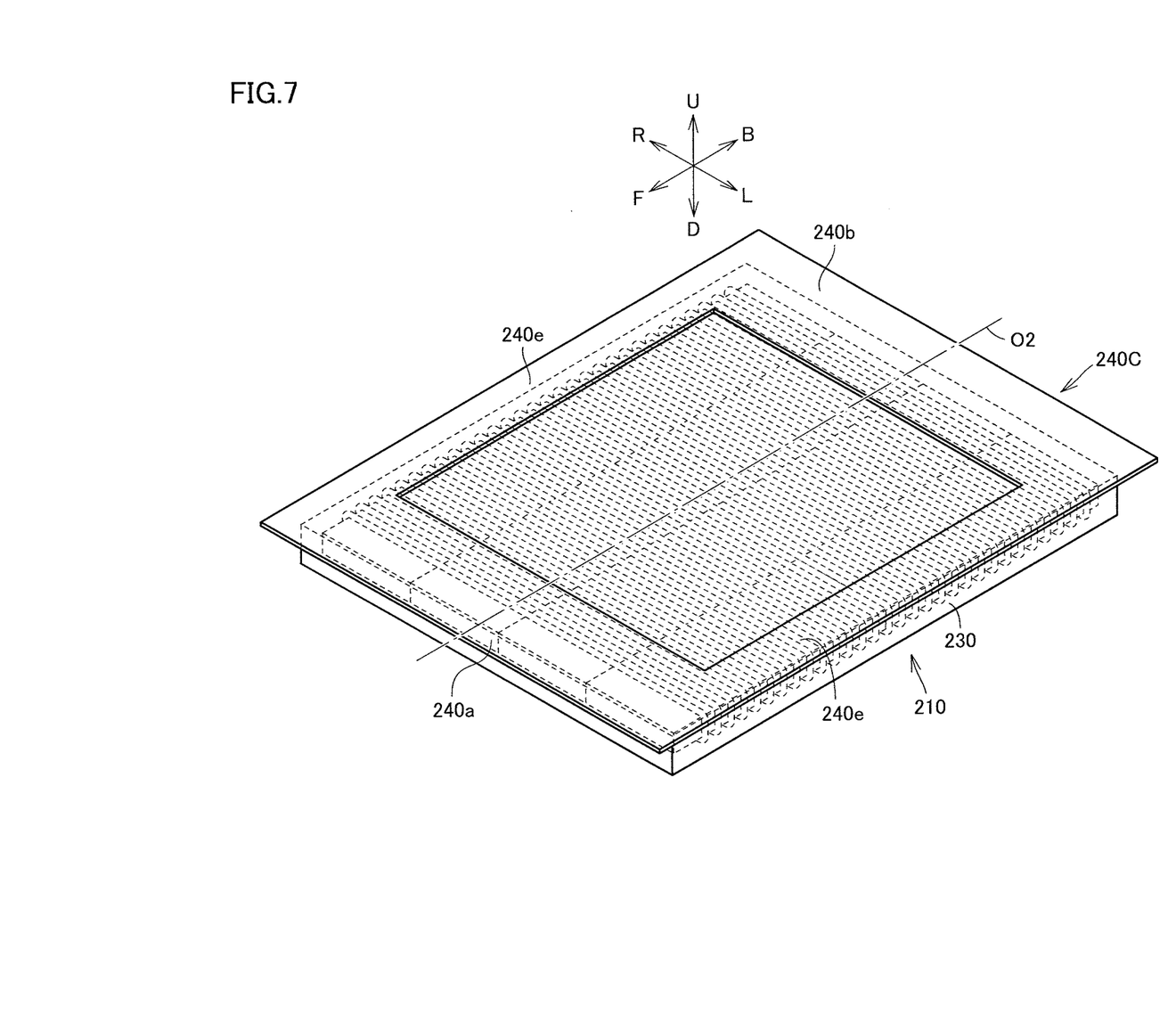
FIG. 7 is a perspective view showing a structure of a shield of a fourth embodiment.

With reference to FIG. 7, a configuration of a shield 240C adopted for a power receiving device in a fourth embodiment will now be described. Shield 240C in the present embodiment has a form such that first shield 240*a* and second shield 240*b* are coupled by a coupling shield 240*e* at a location directly above the opposite end sides of power receiving unit 210. As a result, the configuration is such that shield 240C is not provided at a location directly above a center portion of power receiving unit 210. This configuration can also achieve a function and effect similar to that of the above first embodiment.

Fifth Embodiment: Structure of Power Transmitting Unit 410 and Shield 440

Figure 8:
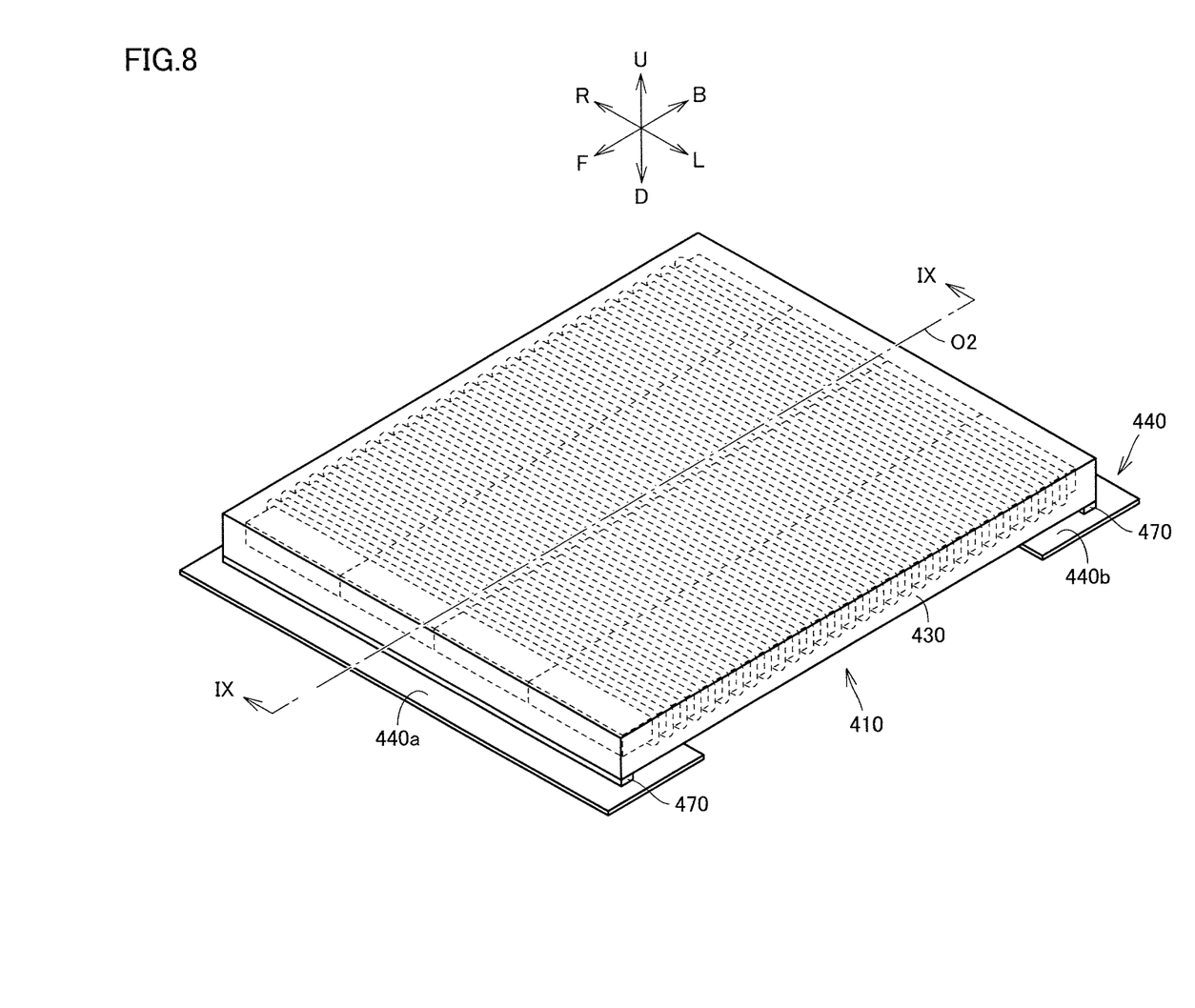
FIG. 8 is a perspective view showing a structure of a power transmitting unit and a shield of a fifth embodiment.
Figure 9:
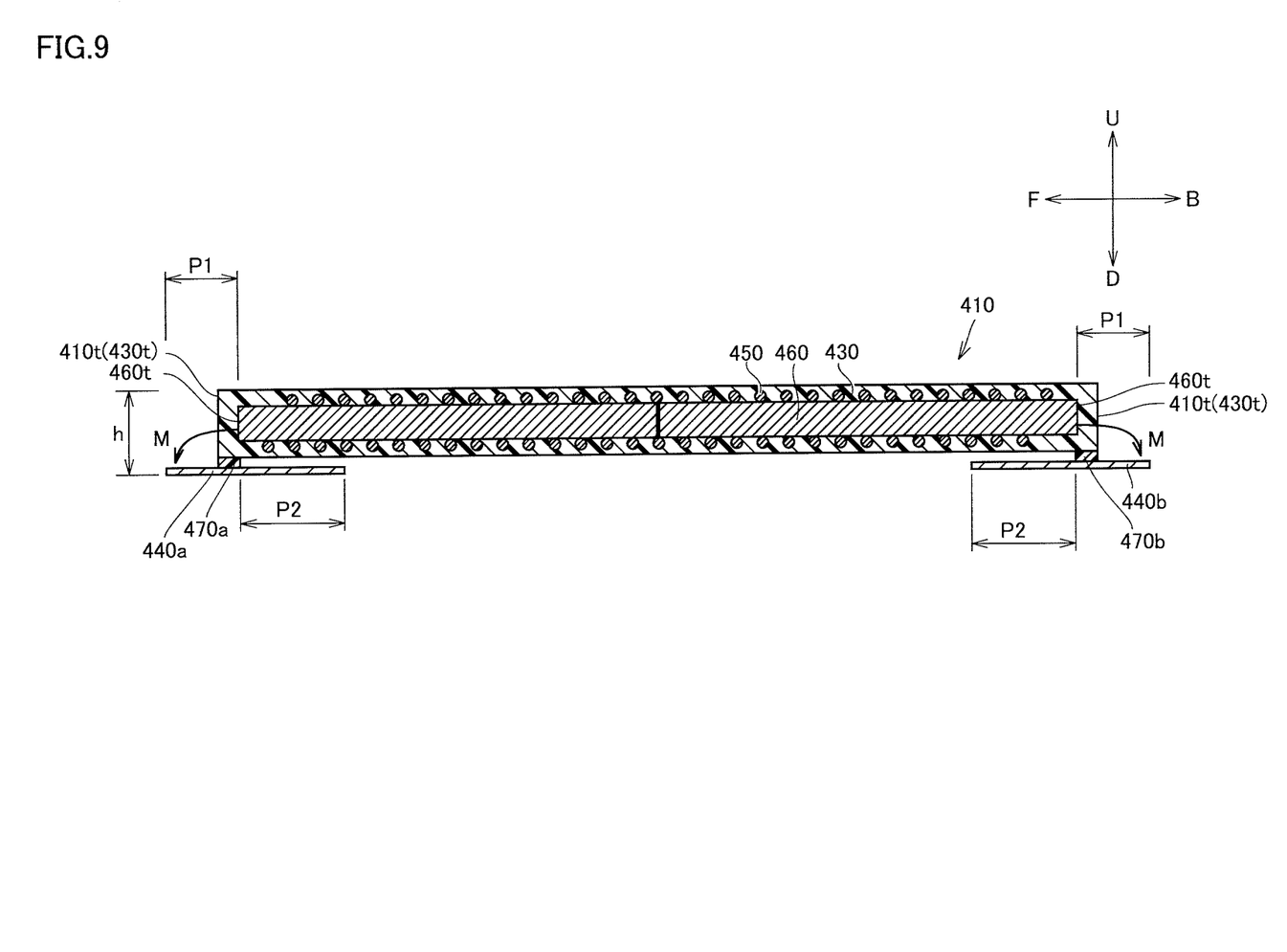
FIG. 9 is a cross section taken along a line IX-IX in FIG. 8 and seen in the direction of the arrows.

Power transmitting unit 410 and shield 440 in the present embodiment have a basic configuration identical to that of power receiving unit 210 and shield 240 in the first embodiment described above. They are different in that the former is upside down relative to the latter.

Power transmitting unit 410 includes power transmitting coil 450, core unit 460, and resin member 430 where core unit 460 and power transmitting coil 450 are buried therein. Power transmitting coil 450 is helically wound on core unit 460 about coil winding axis O2 to surround core unit 460 including upper and lower surfaces of core unit 460. Resin member 430 has a plate-like shape having a side surface, an upper surface and a lower surface, and has core unit 460 and power transmitting coil 450 buried therein. Resin member 430 is for example a noncombustible polyester or the like.

Core unit 460 has a plate-like shape as a whole having a side surface, an upper surface and a lower surface. Core unit 460 is formed of a plurality of split cores combined together and surrounded by an insulating paper. The split cores are ferrite. Eight split cores are used in the present embodiment. Each split core is formed in a rectangular parallelepiped and has the same shape and size. The eight split cores are aligned in four rows in the vehicular widthwise direction (or in the column direction) of vehicular body 110 and in two rows in the forward and backward direction of vehicular body 110.

In FIG. 8 and FIG. 9, a total height (h) of power transmitting unit 410 including shield 440 is approximately 20 mm. The thickness of core unit 460 is approximately 9 mm, the coil diameter of power transmitting coil 450 is approximately 3 mm, the thickness of resin member 430 on the side of the upper surface and that of the lower surface (or the resin's covering thickness) is approximately 4 mm, and the plate thickness (t1) of shield 440 is approximately 0.5 mm.

(Shield 440)

Shield 440 is provided at a side (i.e., a lower side in the present embodiment) opposite to a side at which at least power receiving unit 210 is located, with power transmitting unit 410 posed therebetween. Shield 440 includes a first shield 440*a* disposed on the side of one end of power transmitting unit 410 in the axial direction of coil winding axis O2, and a second shield 440*b* disposed on the side of the other end of power transmitting unit 410. In the present embodiment, first shield 440*a* and second shield 440*b* for a total of two pieces of shields are used. First shield 440*a* and second shield 440*b* are rectangular copper or aluminum plates or the like having a shielding function.

By a spacer 470*a* using a resin member etc. provided on an upper surface of resin member 430, first shield 440*a* is spaced from the upper surface of resin member 430 by a prescribed spacing. By a spacer 470*b* using a resin member etc. provided on an upper surface of resin member 430, second shield 440*b* is spaced from the upper surface of resin member 430 by a prescribed spacing. By providing a space between first and second shields 440*a* and 440*b* and the upper surface of resin member 430, an insulation performance between first and second shields 440*a* and 440*b* and resin member 430 can be improved.

First shield 440*a* and second shield 440*b* are spaced by a prescribed spacing in the direction of coil winding axis O2, and no shield is provided at a location directly above a center portion of power transmitting unit 410.

With reference to FIG. 9, first shield 440*a* is disposed on the side of one end of power transmitting unit 410 in the axial direction of coil winding axis O2. Similarly, second shield 440*b* is disposed on the side of the other end of power transmitting unit 410 in the axial direction of coil winding axis O2. As a result, shield 440 is not provided at a center portion of power transmitting unit 410 including opposite end sides (or ends in the RL direction) of power transmitting unit 410, and the center portion of power transmitting unit 410 including the opposite end sides of power transmitting unit 410 is not covered with shield 440.

(Function and Effect)

Power transmitting unit 410 and shield 440 including the above configuration can also achieve a function and effect similar to that of power receiving unit 210 and shield 240 of the first embodiment. Note that applying the configurations of the second to fourth embodiments to power transmitting unit 410 and shield 440 can also provide a similar function and effect.

Other Embodiment

Although each above embodiment describes a case where a resin material using a noncombustible polyester or the like is used as resin members 230, 430, it is not limited to a resin material as long as it is a sealing member having a function equivalent to the resin material and allowing the core unit and the power receiving/transmitting coil to be buried therein.

In each above embodiment, a shield may also be provided at a side surface of resin member 230 of power receiving unit 210 and a side surface of resin member 430 of power transmitting unit 410. However, in the configuration of power receiving unit 210 and power transmitting unit 410 in each above embodiment, absence of a shield at the side surface does not have a significant effect on a distribution of an electromagnetic field which leaks sideways.

Accordingly, as indicated in each above embodiment, in power receiving unit 210, a configuration can be adopted which provides shield 240 only on the side of an upper surface of resin member 230, and in power transmitting unit 410, a configuration can be adopted which provides shield 440 only on the side of a lower surface of resin member 430.

In each above embodiment, core units 260, 460 are not limited to the above configuration, and can be configured of a plurality of split cores aligned in the row direction and/or the column direction. When core units 260, 460 are configured using a plurality of split cores, it is preferable that the number of divisions in the direction in which coil winding axis O2 extends ("2" in the above embodiment) be less than the number of divisions in a direction orthogonal to the direction in which the coil winding axis extends ("3" in the above embodiment).

While each above embodiment has described a case where power receiving unit 210 of power receiving device 200 is fixed to floor panel 114, it is not limited to this fixation structure. For example, power receiving unit 210 may be suspended from side members 115R and 115L or the cross member.

In each above embodiment, power receiving unit 210 does not necessarily have its coil wound about winding axis O2. For example, it may have its coil wound about a winding axis extending in a direction orthogonal to winding axis O2 (i.e., the (R-L) direction). In this case, power transmitting unit 410 also has its coil wound about a winding axis extending in the same direction.

While each above embodiment indicates as power receiving unit 210 a structure in which power receiving coil 250 is sealed together with core unit 260 by resin member 230, it is possible to adopt the configuration of each above embodiment for power receiving unit 210 of a structure which does not use resin member 230. This also applies to power transmitting unit 410.

While each embodiment has thus been described, it should be understood that the embodiments disclosed herein are illustrative and non-restrictive in any respect. The scope of the present invention is defined by the terms of the claims, and is intended to include any modifications within the meaning and scope equivalent to the terms of the claims.

REFERENCE SIGNS LIST

100: electrically powered vehicle; 110: vehicular body; 111L, 111R, 118L, 118R: vehicular wheel; 112: bottom surface; 114: floor panel; 115L, 115R: side member; 116: exhaust pipe; 117: catalyst; 119: engine; 120: vehicular ECU; 130: rectifier; 140: DC/DC converter; 150: battery; 160: power control unit (PCU); 170: motor unit; 180, 322: communication unit; 200: power receiving device; 210, 210A: power receiving unit; 210*t*, 230*t*, 260*t*: end; 220, 420: capacitor; 230, 430: resin member; 240, 240A, 240B, 240C, 440: shield; 240*a*, 440*a*: first shield; 240*b*; 440*b*: second shield; 270*a*, 270*b*: spacer; 260, 460: core unit; 260A: upper surface; 260B: lower surface; 260C, 260D, 260E, 260F: side surface; 261-268: split core; 250: power receiving coil; 290: gap; 300: external power feeding apparatus; 310: high-frequency power device; 320: power transmitting ECU; 330: alternating current power supply; 400: power transmitting device; 410, 410A: power transmitting unit; 450: power transmitting coil; 1000: power transfer system; O2: coil winding axis; P1: center position.

The invention claimed is:

1. A power receiving device comprising:
a power receiving unit receiving electric power contactlessly from a power transmitting unit having a power transmitting coil, in a state in which the power receiving unit faces the power transmitting unit; and
a shield provided at a side opposite to a side at which at least the power transmitting unit is located, with the power receiving unit posed therebetween,
the power receiving unit including a core unit having a plate-like shape and including a side surface, an upper surface and a lower surface, and a power receiving coil helically wound about a coil winding axis to surround the core unit including the upper and lower surfaces,
the shield including a first shield disposed on a side of one end of the power receiving unit in an axial direction of the coil winding axis, and a second shield disposed on a side of an other end of the power receiving unit in the axial direction of the coil winding axis,
the shield being absent at least at a location directly above a center portion of the power receiving unit.

2. The power receiving device according to claim 1, wherein:
the first shield and the second shield are separated in rectangles, respectively;
the first shield is disposed on the side of one end of the power receiving unit in the axial direction of the coil winding axis; and
the second shield is disposed on the side of the other end of the power receiving unit in the axial direction of the coil winding axis.

3. The power receiving device according to claim 1, wherein the first shield and the second shield are coupled by a coupling shield disposed at a location directly above opposite end sides of the power receiving unit to thus have a looped shape.

4. A power transmitting device comprising:
a power transmitting unit transmitting electric power contactlessly to a power receiving unit having a power receiving coil, in a state in which the power transmitting unit faces the power receiving unit; and
a shield provided at a side opposite to a side at which at least the power receiving unit is located, with the power transmitting unit posed therebetween,
the power transmitting unit including a core unit having a plate-like shape and including a side surface, an upper surface and a lower surface, and a power transmitting coil helically wound about a coil winding axis to surround the core unit including the upper and lower surfaces,
the shield including a first shield disposed on a side of one end of the power transmitting unit in an axial direction of the coil winding axis, and a second shield disposed on a side of an other end of the power transmitting unit in the axial direction of the coil winding axis,
the shield being absent at least at a location directly above a center portion of the power transmitting unit.

5. The power transmitting device according to claim 4, wherein:
the first shield and the second shield are separated in rectangles, respectively;
the first shield is disposed on the side of one end of the power transmitting unit in the axial direction of the coil winding axis; and
the second shield is disposed on the side of the other end of the power transmitting unit in the axial direction of the coil winding axis.

6. The power transmitting device according to claim 5, wherein the first shield and the second shield are coupled by a coupling shield disposed at a location directly above opposite end sides of the power transmitting unit to thus have a looped shape.

* * * * *